Dec. 13, 1932.  M. EHLINGER  1,890,575
FEED WATER REGULATOR FOR BOILERS AND THE LIKE
Filed Sept. 30, 1929
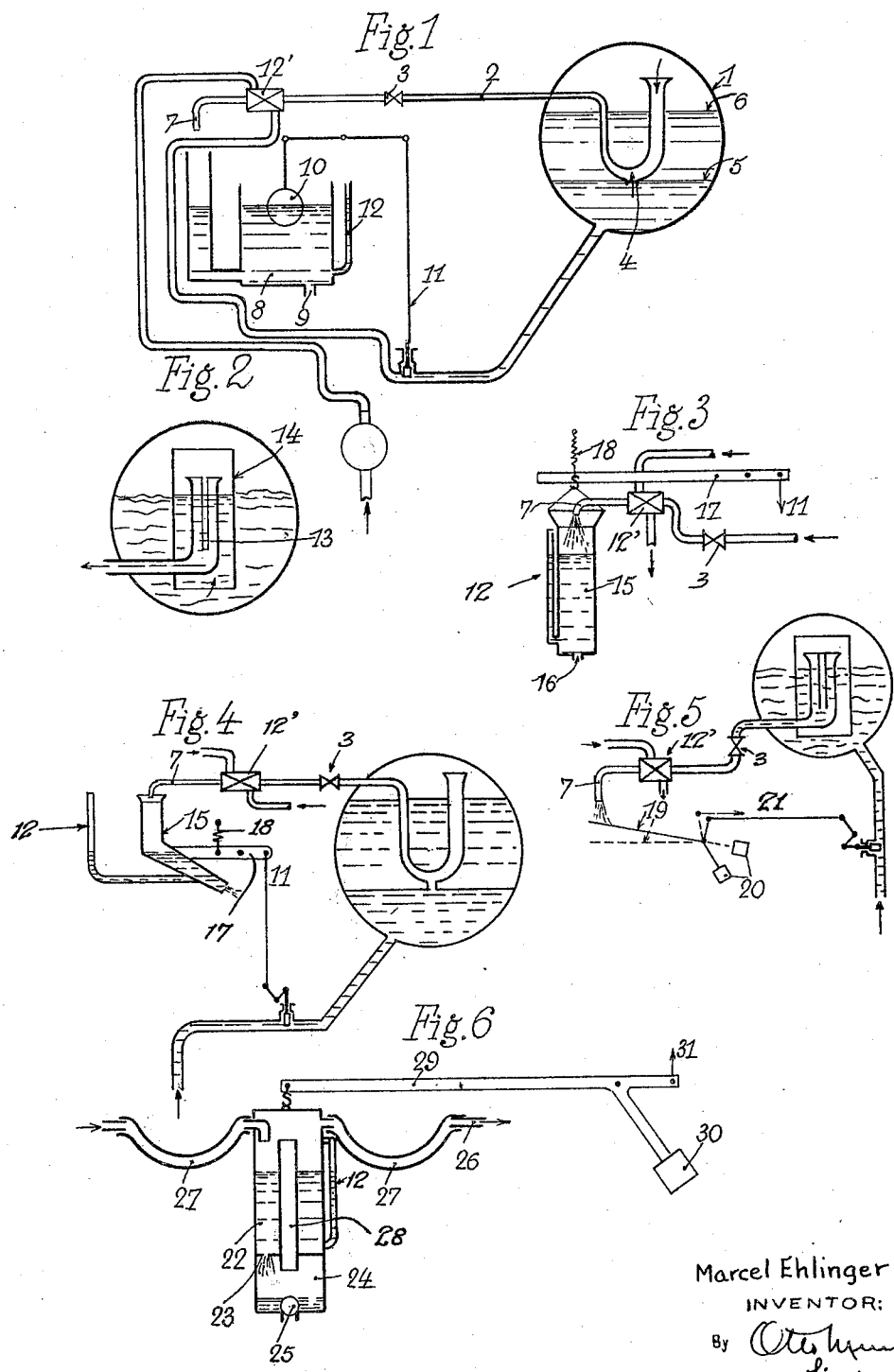
Marcel Ehlinger
INVENTOR:
By *Otto Munk*
his Attorney.

Patented Dec. 13, 1932

1,890,575

UNITED STATES PATENT OFFICE

MARCEL EHLINGER, OF MULHOUSE, FRANCE, ASSIGNOR TO SOCIETE ALSACIENNE DE CONSTRUCTIONS MECANIQUES, OF MULHOUSE, FRANCE

FEED WATER REGULATOR FOR BOILERS AND THE LIKE

Application filed September 30, 1929, Serial No. 396,125, and in France January 17, 1929.

It is usual to maintain the level of water in boilers automatically at a definite height by means of suitable apparatus, utilizing expansion or the displacement of a float located in the boiler, or utilizing some other principle. When boilers are fed with impure water, it is necessary to blow down the impurities contained therein, either continuously or intermittently, so as to remove part or all of said impurities.

The arrangement forming the subject of the present invention consists in utilizing the water blown down or discharged continuously from the boiler or the like, for controlling the supply of feed water to said boiler, the arrangement being such that the amount of water blown down will vary as a function of the level of the water in the boiler or the like.

To this end, use is made of a mixture of water and steam contained in the boiler, the proportions of water and steam varying according to the height of the water level, and this mixture is caused to pass through a throttle. In these conditions, the weight of the mixture discharged past the throttle varies accordingly to the proportions of water and steam contained in said mixture. The variable mixture of water and steam may be discharged by means of a tube which opens into the steam space of the boiler and affords passage to water by means of openings such as holes or slits opening into the water space. The water leaving the throttle acts on a member which controls in turn the delivery of feed water to the boiler in such manner that this action is a function of the amount of water thus discharged so as to maintain the normal level in the boiler by opening or closing a cock or a by-pass, on the feed water pipe, thus increasing or reducing the delivery of the feed water pump, or the like.

In one embodiment of the invention, the water thus blown down is caused to flow into a receptacle where it reaches a level which depends on the amount of water blown down from the boiler. The variations in this level or the subsequent variations in the weight of the receptacle are utilized to actuate the feed water controlling member.

In another embodiment of the invention, the blow down from the boiler is caused to flow on a movable surface, subjected to the action of an antagonistic member such as a spring and operatively connected with the feed water controlling member.

The invention may obviously be applied to heaters or boilers, using a liquid other than water.

The accompanying drawing illustrates diagrammatically and by way of example several embodiments of the invention.

Fig. 1 shows a boiler provided with a feed water regulator according to a first embodiment of the invention.

Fig. 2 shows a modification of the blow-down tube.

Figs. 3, 4, 5 and 6 show various modifications of the device which is actuated by the blow-down.

In Fig. 1, 1 denotes a boiler drum and 2 a tube in communication with the atmosphere and provided with a throttle 3, which may be formed by a reduced section of the tube itself. Tube 2 has a goose neck opening into the steam space of the boiler drum, and whose lower part is provided with a hole 4 of suitable size.

When the water level in drum 1 is at 5, tube 2 is traversed by a current of saturated dry steam. When the water level in the drum is at 6, said tube is traversed by a current of steam, mixed with a certain amount of water drawn in through the opening 4. This amount of water depends on the section of said opening and on the difference between the levels 5 and 6. In the first instance, a jet of steam is discharged through the opening 7, while, in the second instance, a jet of water and steam is discharged through said opening 7.

The water discharged at 7 collects in a receptacle 8, having a perforated bottom, or provided with a branch pipe 9. A float 10 is supported by the water in receptacle 8 at a level which depends on the amount of water delivered to said receptacle. The movements of the float 10 are transmitted in any convenient manner to a throttling member 11 adapted to control the supply of feed water to the boiler.

Due to this arrangement it will be seen that the level of the water can be maintained automatically at a certain height above the opening 4.

The receptacle 8 may be provided with a graduated level indicating tube 12 and the scale indicating the level of water in this tube may be so calibrated as to indicate the level of the water in the boiler.

It may be advantageous that water only should be discharged at the outlet of tube 2 and that the disengagement of the steam be prevented. For this purpose, I may provide a condenser 12' in tube 2. Said condenser may be cooled by the feed water before entering the boiler, or in any other manner.

In Fig. 2, the end of tube 2 within the boiler is provided with a slit 13 in substitution for the hole 4 for the inlet of water into the tube. This slit may be of any suitable shape, so that the amount of water delivered by the tube may be any suitable function of the level of the liquid.

It is preferable that the water which is blown down continuously should come from the lower part of the drum or boiler, which generally contains more impurities than the water at the surface; for this purpose, tube 2 may be surrounded by a much larger tube 14, open at both ends. This tube will also prevent the fluctuations of the level of the liquid from having a detrimental effect upon the inflow of water through the slit 13.

In the form of construction shown in Fig. 3, the water blown down from the boiler, instead of acting on a float, flows into a receptacle 15, whose bottom is provided with an opening 16 and which is suspended from a lever 17 having a balancing spring 18. The receptacle 15 being more or less filled with water has a variable weight, and it is heavier as the weight of water delivered from the outlet 7 is greater. The lever 17 is thus tilted to a greater or less extent and acts on the controlling member 11 by any suitable transmission means.

In Fig. 4 the receptacle 15 is inclined from the vertical, whereby the leverage from the pivot axis thereof is variable according as said receptacle is more or less filled with water, and this feature may afford certain advantages.

In Fig. 5, the water flowing from the outlet 7 acts on a blade or plate 19, balanced by a counter-weight 20. The plate, impacted by the stream of water and steam, is forced downwards with a greater or less force according to the speed of the stream, thus displacing an actuating member 21, connected with the controlling member 11.

In Fig. 6, the condenser 12' is eliminated, whereby the water is mixed with steam. In this case, the mixture is delivered to a tube 22, provided with a partition having an opening or a nozzle 23. The water passes through this opening into a chamber 24, from which it is discharged through an opening controlled by a float valve 25. The steam escapes through a tube 26 and may be further utilized or condensed. The tube 22 is suspended from a lever 29, balanced by a counter weight 30. The movements of the tube 22 are transmitted to an actuating member 31, connected with controlling member 11. The tube 22 being movable, the inlet and outlet pipes 27 are made of flexible hoses.

A tube 28, extending through the partition, serves to balance the pressure in the two chambers, in order that the rate of discharge of the water should only be a function of its level.

The invention is not restricted to the constructional forms above described and contemplates broadly the feature of employing variations in the amount of water discharged from a blow down tube for controlling the feed water supply or the like. It is applicable in general to any receptacle enclosing a liquid under pressure, in the presence of its vapour or a gas or both, wherein the level of the liquid should be maintained constant, in particular for stationary or rotary steam generators. It should be understood that, besides the blow down provided for controlling the supply of feed water, a further blow down may be provided at any suitable point of the receptacle.

Having now described my invention what I claim as new and desire to secure by Letters Patent is:

1. In combination: a closed chamber, supply means for supplying said chamber with liquid under pressure, blow down means for continuously discharging liquid from said chamber at a rate depending on the liquid level in said chamber, and controlling means responsive to the rate of discharge of the liquid through said blow down means for controlling said supply means.

2. In combination: a closed chamber containing a variable mixture of a liquid phase and a gaseous phase, means for supplying said chamber with liquid under pressure, blow down means for continuously discharging liquid from said chamber at a rate depending on the relative proportions of liquid phase and gaseous phase in said chamber, and controlling means responsive to the rate of discharge of the liquid through said blow down means for controlling said supply means.

3. In combination: a closed chamber containing a liquid and a gaseous medium in variable proportions, means for supplying said chamber with liquid under pressure, a tube opening into the upper portion of said chamber containing said gaseous medium and extending through the lower portion thereof containing said liquid, an aperture in the tube portion bathed by said liquid, whereby liquid is forced by said gaseous medium through said tube at a variable rate depending upon the liquid level, and controlling means responsive to the rate of discharge of the liquid through said tube for controlling said supply means.

4. In the combination claimed in claim 2, a condenser associated with said blow down means for condensing any portion of the gaseous phase discharged through said blow down means.

5. The combination claimed in claim 1, wherein said controlling means comprise a receptacle adapted to receive the liquid discharged from said blow down means and having an orifice for constantly discharging liquid from said receptacle at a determined rate, said controlling means being responsive to the weight of liquid in said receptacle for controlling said supply means.

6. The combination claimed in claim 1, wherein said controlling means includes a movable surface adapted to be impacted by the liquid discharged from said blow down means.

7. The combination claimed in claim 1, wherein said controlling means includes a receptacle adapted to receive the liquid discharged from said blow down means and having an orifice for constantly discharging liquid from said receptacle at a determined rate, and a graduated liquid level indicating tube for indicating the liquid level in said receptacle and hence in said closed chamber.

8. In the combination claimed in claim 3, a throttle in said tube past said aperture.

9. The combination claimed in claim 1, wherein said controlling means comprises a receptacle adapted to receive the liquid discharged from said blow down means and having an orifice for constantly discharging liquid from said receptacle at a determined rate and means whereby the leverage of the weight of the liquid in said receptacle will vary according to the liquid level in said receptacle.

10. In combination with a boiler, a feed water regulator comprising blow down means for continuously discharging water from a part of said boiler containing water and steam at a rate depending on the water level in said boiler part, and controlling means responsive to the rate of discharge of the water through said blow down means adapted to control the water feeding means for said boiler.

In testimony whereof I have signed my name to this specification.

MARCEL EHLINGER.